(12) United States Patent
Lessing

(10) Patent No.: US 6,787,007 B2
(45) Date of Patent: Sep. 7, 2004

(54) POLYMERIC HYDROGEN DIFFUSION BARRIER, HIGH-PRESSURE STORAGE TANK SO EQUIPPED, METHOD OF FABRICATING A STORAGE TANK AND METHOD OF PREVENTING HYDROGEN DIFFUSION

(75) Inventor: Paul A. Lessing, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 81 days.

(21) Appl. No.: 10/253,265

(22) Filed: Sep. 23, 2002

(65) Prior Publication Data

US 2004/0055897 A1 Mar. 25, 2004

(51) Int. Cl.[7] .................................................. C25B 9/00
(52) U.S. Cl. ........................ 204/242; 204/252; 204/424
(58) Field of Search ................................ 204/242, 252, 204/424

(56) References Cited

U.S. PATENT DOCUMENTS

| | | | |
|---|---|---|---|
| 5,577,630 A | 11/1996 | Blair et al. | |
| 6,248,469 B1 | 6/2001 | Formato et al. | |
| 6,319,293 B1 * | 11/2001 | Debe et al. | 29/623.3 |
| 6,425,993 B1 * | 7/2002 | Debe et al. | 204/296 |

FOREIGN PATENT DOCUMENTS

| | | |
|---|---|---|
| EP | 0 633 422 A1 | 1/1995 |
| WO | WO 00/49330 | 8/2000 |
| WO | WO 02/058205 A2 | 7/2002 |

OTHER PUBLICATIONS

Encyclopedia of Polymer Science and Engineering, Liquid Crystalline Polymers to Mining Applications, vol. 9, p. 562, (1987).

Hirschenhofer, J.H., et al., "Fuel Cells A Handbook (Rev. 3)," p. 1–6, Jan. 1994.

Hydrogen: Its Technology and Implications, Utilization of Hydrogen, vol. IV, CRC Press, Boca Raton, Florida, pp. 158–159.

Kearns, Thomas F., "Electrolytic Protection Against High–Temperature Oxidation," IDA Paper P–2093, Nov. 1988.

* cited by examiner

Primary Examiner—Arun S. Phasge
(74) Attorney, Agent, or Firm—Trask Britt PC

(57) ABSTRACT

An electrochemically active hydrogen diffusion barrier which comprises an anode layer, a cathode layer, and an intermediate electrolyte layer, which is conductive to protons and substantially impermeable to hydrogen. A catalytic metal present in or adjacent to the anode layer catalyzes an electrochemical reaction that converts any hydrogen that diffuses through the electrolyte layer to protons and electrons. The protons and electrons are transported to the cathode layer and reacted to form hydrogen. The hydrogen diffusion barrier is applied to a polymeric substrate used in a storage tank to store hydrogen under high pressure. A storage tank equipped with the electrochemically active hydrogen diffusion barrier, a method of fabricating the storage tank, and a method of preventing hydrogen from diffusing out of a storage tank are also disclosed.

18 Claims, 3 Drawing Sheets

POLYMERIC HYDROGEN DIFFUSION BARRIER, HIGH-PRESSURE STORAGE TANK SO EQUIPPED, METHOD OF FABRICATING A STORAGE TANK AND METHOD OF PREVENTING HYDROGEN DIFFUSION

GOVERNMENT RIGHTS

The United States Government has rights in the following invention pursuant to Contract No. DE-AC07-991D13727 between the United States Department of Energy and Bechtel BWXT Idaho, LLC.

BACKGROUND OF THE INVENTION

1. Field of the Invention

An electrochemically active gas diffusion barrier is disclosed. The electrochemically active barrier may be used in a high-pressure storage tank to prevent hydrogen from diffusing out of the storage tank.

2. State of the Art

Compressed gases, such as natural gas and hydrogen, are being developed as alternative fuels to replace gasoline and diesel fuels. In order to use compressed gases as fuel sources in vehicles, the vehicles are modified or redesigned to use these alternative fuel sources. For instance, conventional storage tanks for gasoline and diesel fuels cannot withstand high pressures associated with the use of compressed gases. A storage tank of a vehicle that runs on such alternative fuels is configured with an internal shape to withstand the high pressures. The storage tank is also limited in its size and external shape by the space, or available storage envelope, under or within the vehicle that is available for mounting the storage tank. In addition, weight of the storage tank is desirably kept to a minimum so that it does not increase the overall weight of the vehicle. Conventional storage tanks for vehicles that run on alternative fuels are bottle-shaped and are mounted to the underside of the vehicle.

A conformable storage tank for compressed natural gas is disclosed in U.S. Pat. No. 5,577,630 to Blair et al. ("Blair"), the disclosure of which is incorporated herein by reference. The conformable storage tank is formed from a polymeric liner that is purported to be impermeable to the compressed natural gas stored in the storage tank. The polymeric liner is overwrapped with a composite material to form a reinforcement layer over the polymeric liner. The polymeric liner is a thin layer of a polyamide, a polyethylene, a polypropylene, a polyurethane, or a blend or copolymer of these materials. The composite material is typically a carbon, glass, graphite, aramid, or other fiber bound in a thermoplastic or thermoset epoxy resin. The conformable storage tank has a normal operating pressure to 3,600 pounds per square inch ("psi") and a burst strength of 11,000 psi.

While the polymeric liner of Blair is used to prevent compressed natural gas from diffusing out of the storage tank, this polymeric liner is not useful to store hydrogen under any significant pressure because hydrogen has a significantly higher permeability rate through polymers than natural gas. The permeability rate of hydrogen is up to 80 times greater than that of natural gas, depending on the polymeric material used in the polymeric liner. If hydrogen is stored in a storage tank having a polymeric liner similar to that in Blair, hydrogen pressure is gradually lost as the hydrogen diffuses out of the storage tank. The diffusing hydrogen also affects the bonding between the polymeric liner and the reinforcement layer because the hydrogen weakens the bond between the two layers.

While other materials are less permeable to hydrogen than polymers, these materials are not currently feasible for coating a polymeric liner of a storage tank to prevent the diffusion of hydrogen and, in addition, exhibit other undesirable characteristics for vehicular applications. Metals and ceramics are less permeable to hydrogen than polymers, but have a higher stiffness or modulus value. If metal or ceramic coatings are formed on the polymeric liner, the coatings would crack when the storage tank was pressurized with hydrogen due to the different stiffnesses of the polymeric liner and the coating, causing the more yieldable polymeric liner to flex before the stiffer coating. Amorphous metals or ceramics also have low hydrogen permeability, but have even higher modulus values. Furthermore, these amorphous metals and ceramics are not easily formed in thin coatings. Coating techniques, such as sputtering or chemical vapor deposition, are problematic because sputtering equipment is not available for coating the inside of a storage tank and chemical vapor deposition requires high temperatures that would damage or destroy the polymeric liner. Using metals and ceramics to coat the polymeric liner is further problematic because such materials are heavier than polymers and drastically increase the overall weight of a storage tank.

It would be desirable to store high-pressure hydrogen in a storage tank that is effectively impermeable to hydrogen diffusion. It would be further desirable to reduce the permeability of hydrogen through polymeric liners so that storage tanks currently used to store compressed natural gas may be modified to store hydrogen.

BRIEF SUMMARY OF THE INVENTION

The present invention comprises a hydrogen diffusion barrier to prevent hydrogen from diffusing through a polymer substrate. The hydrogen diffusion barrier comprises three polymer layers and an energy source. The three polymer layers comprise an anode layer, a cathode layer, and an interposed electrolyte layer, which is conductive to protons and impermeable to hydrogen. The hydrogen diffusion barrier uses an electrochemically active structure to prevent the hydrogen from diffusing through the polymer substrate. If hydrogen passes through the electrolyte layer, a catalytic material present adjacent the interface of the electrolyte layer and the anode layer catalyzes an electrochemical reaction to convert the hydrogen to protons and electrons. The protons and electrons are transported to the cathode layer and reacted to form hydrogen. A catalytic material present adjacent the interface of the cathode layer and the electrolyte layer may be used to enhance the formation of hydrogen.

The present invention also comprises a storage tank for storing high-pressure hydrogen. The storage tank comprises a polymer substrate bonded to a reinforcement layer and a hydrogen diffusion barrier bonded to the polymer substrate. The hydrogen diffusion barrier comprises an anode layer and a cathode layer, each of which comprises a polymer material permeable to hydrogen. The hydrogen-diffusion barrier also comprises an energy source and an electrolyte layer comprising a polymer material conductive to protons and impermeable to hydrogen. The electrolyte layer is disposed between the anode layer and the cathode layer and a catalytic material is present adjacent the interface between the electrolyte layer and at least one of the anode layer and the cathode layer, and preferably adjacent both interfaces. The hydrogen diffusion barrier utilizes this electrochemically active structure to prevent hydrogen from diffusing through the polymer substrate and out of the storage tank.

The present invention further comprises a method of preventing hydrogen from diffusing out of a storage tank.

The method comprises providing a storage tank having a polymer substrate bonded to a surrounding reinforcement layer and a hydrogen diffusion barrier bonded to and within the polymer substrate. The hydrogen diffusion barrier comprises an anode layer, a cathode layer, an interposed electrolyte layer, and an energy source. The storage tank is pressurized with hydrogen and any hydrogen that diffuses through the electrolyte layer is transported back to the storage tank using an electrochemically active structure including a catalytic material to catalyze a reaction from hydrogen to protons and electrons. The protons and electrons are transported to the cathode layer where they react in the presence of a catalytic material to form hydrogen, which diffuses back into the storage tank. The energy source provides a sufficient amount of energy to transport the electrons to the cathode layer while the protons diffuse through the electrolyte layer back to the cathode layer.

The present invention still further includes a method of fabricating a storage tank to store high-pressure hydrogen. The method comprises providing a polymer substrate and bonding a reinforcement layer to a first surface of the polymer substrate. A hydrogen diffusion barrier susceptible to electrical stimulation to become electrochemically active is formed on a second surface of the polymer substrate. The hydrogen diffusion barrier comprises a polymeric anode layer permeable to hydrogen, a polymeric electrolyte layer conductive to protons and substantially impermeable to hydrogen, and a polymeric cathode layer permeable to hydrogen. The three polymer layers of the hydrogen diffusion barrier may be formed by dip-coating or spray-coating. A catalytic material may be disposed adjacent the interfaces between the polymeric layers to facilitate dissociation of hydrogen into protons and electrons and to facilitate formation of hydrogen therefrom. An energy source is operably coupled to the anode layer and the cathode layer to render the hydrogen diffusion barrier electrochemically active.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

An electrochemically active barrier to prevent diffusion of hydrogen through a polymer substrate is disclosed. The electrochemically active barrier is bonded to the polymer substrate and uses an electrically stimulated structure to electrochemically prevent high-pressure hydrogen from reaching the polymer substrate and diffusing therethrough. The electrochemically active barrier or hydrogen diffusion barrier is used in a storage tank lined with the polymer substrate to store high-pressure hydrogen. The hydrogen diffusion barrier is substantially impermeable to hydrogen and is also able to return any hydrogen that diffuses out of the storage tank back to the storage tank before reaching the polymer substrate using an electrochemical reaction.

The hydrogen diffusion barrier may be bonded to the polymer substrate. The hydrogen diffusion barrier may have a low permeability to hydrogen so that hydrogen does not diffuse through the hydrogen diffusion barrier and the polymer substrate. The hydrogen diffusion barrier may also have a stiffness or modulus value similar to that of the polymer substrate so that excessive stress resulting from the pressurized hydrogen does not cause dissimilar strain tendencies between the hydrogen diffusion barrier and the polymer substrate, which may initiate cracking when the storage tank is pressurized. In addition, the hydrogen diffusion barrier may be formed using coating techniques that produce a hermetic coating that is free of pin holes. Furthermore, the hydrogen diffusion barrier may be formed from low cost, low weight polymeric materials so that the added cost and weight is minimal.

Figure 1:
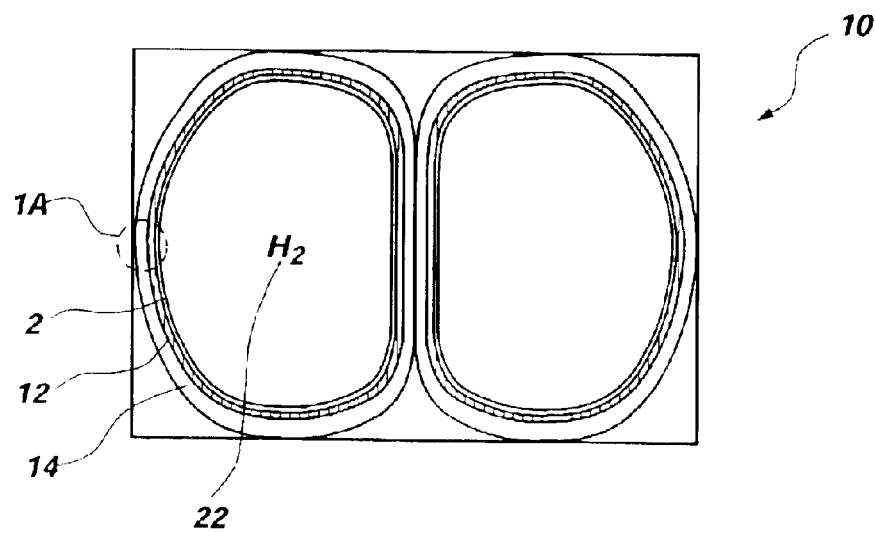
FIG. 1 is a cross-sectional view of a conformable storage tank having a hydrogen diffusion barrier of the present invention.
Figure 1A:
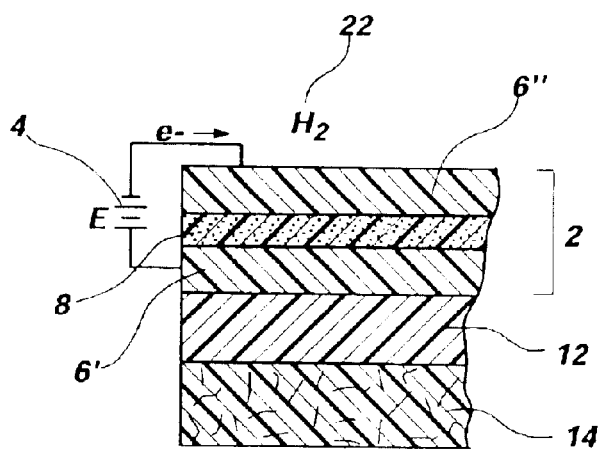
FIG. 1A is an enlarged view of the circled region in FIG. 1.

The hydrogen diffusion barrier 2 may include three polymer layers and an energy source 4, as shown in FIG. 1A, comprising an enlargement of the circled region of FIG. 1. Two of the polymer layers may be electrically conductive while the third polymer layer may be electrically insulative, comprising a dielectric material. The electrically conductive polymer layers may form electrode layers 6, such as an anode layer 6' and a cathode layer 6". The anode layer 6' and cathode layer 6" may be formed from polymeric materials that are either porous or dense. As used herein, the term "porous" refers to a polymeric material that is permeable to very small diameter atoms or molecules (i.e. hydrogen or helium). The term "dense" refers to a polymeric material that is substantially impermeable (or has a low level of permeability) to large diameter gaseous atoms or molecules (i.e. argon or nitrogen) but has a higher level of permeability to very small diameter atoms or molecules (i.e. hydrogen or helium). It is currently preferred that the anode layer 6' is a dense polymeric material and the cathode layer 6" is a porous polymeric material. However, it is also contemplated that the anode layer 6' may be a porous polymeric material while the cathode layer 6" may be a dense polymeric material. In this situation, the porous anode layer 6' may facilitate the removal of hydrogen from an interface between the electrolyte layer 8 and the anode layer 6' when the protons are recombined with electrons to form hydrogen. Additionally, both of the electrode layers 6 may be dense polymeric materials.

The electrode layers 6 used in the hydrogen diffusion barrier 2 may be sufficiently permeable to hydrogen so that a small portion of the total hydrogen passes through the layers. The electrode layers 6 may have similar hydrogen permeabilities to those of polyethylene or polyvinyl chloride, both of which are polymers and have hydrogen permeabilities of $15.7 \times 10^{-3}$ CF mil/ft$^2$-day-atm and $13.7 \times 10^{-3}$ CF mil/ft$^2$-day-atm, respectively. While the electrode layers 6 are permeable to hydrogen, the overall hydrogen diffusion barrier 2 may, in operation, be substantially impermeable to hydrogen.

Each of the two electrode layers 6 may be formed from the same polymeric material or from a different polymeric material. The polymeric material used in the electrode layers 6 may be similar to the polymeric material used in an electrode of a conventional proton exchange membrane ("PEM"), which is also known as a hydrogen pump. PEMs are known in the art to separate, transport, or supply hydrogen. Electrically conductive polymers that may be used in the electrode layers 6 include, but are not limited to, polyaniline ("PANI" or "PA"), polypyrrole ("PPy"), blends of PA/PPy, and poly(3,4-ethylenedioxythiophene) polystyrenesulfonate ("PEDOT-PSS").

The electrically insulative layer may be an electrolyte layer 8 that is formed from a dense, proton-conducting electrolyte that is desirably substantially impermeable to hydrogen. Such a proton-conducting, substantially hydrogen impermeable electrolyte may be a "dry" electrolyte material. As used herein, a dry electrolyte material is an electrolyte material that is not hydrated or associated with water.

The proton-conducting, substantially hydrogen-impermeable electrolyte used in the electrolyte layer 8 may be formed of a conventional electrolytic material. For example, polybenzimidazole may be used as the proton-conducting, substantially hydrogen-impermeable electrolyte. The electrolytic material may also include a microporous polymer matrix filled with an inorganic proton conductor, such as tungstophosphoric acid. Electrolytic materials commonly used as a membrane in a PEM may also be used. For example, the proton-conducting electrolyte may include, but is not limited to, a perfluorinated sulfonic acid derivative, a polytetrafluoroethylene, a tetrafluoroethylene/(perfluoroalkyl) vinyl ether copolymer, a tetrafluoroethylene/hexafluoropropylene copolymer, a poly(trifluorostyrene) copolymer, a sulfonated poly(aryl ether ketone), a sulfonated polyaromatic based system, or a sulfonated poly(2,6-dimethyl-1,4-phenylene oxide). These electrolytes are commercially available as NAFION® membranes from E. I. du Pont de Nemours and Company (Wilmington, Del.), GORE-SELECT® membranes from W. L. Gore (Newark, Del.), ACIPLEX® from Asahi Kasei Corp. (Tokyo, Japan), and FLEMION from Asahi Glass Co. (Tokyo, Japan).

As shown in FIG. 1, the electrolyte layer 8 may be sandwiched between the anode layer 6' and the cathode layer 6". As noted previously, the electrolyte layer 8 may be substantially impermeable to hydrogen ("$H_2$") but may conduct protons ("$H^+$"). In other words, the electrolyte layer 8 may have a very low permeability to hydrogen but have a high proton conductivity. However, the proton-conducting electrolyte used in the electrolyte layer 8 may not require the same degree of proton conductivity that is necessary in conventional PEMs that are used in fuel cells.

Since the three layers of the hydrogen diffusion barrier 2 are formed from polymers, which weigh less than metal or ceramic materials that are impermeable to hydrogen, the weight of the hydrogen diffusion barrier 2 may be minimal. To keep the weight of the hydrogen diffusion barrier 2 minimal, the thickness of the hydrogen diffusion barrier 2 may also be minimized. The polymer layers may each be approximately 2–25 µm thick, with the hydrogen diffusion barrier 2 having a total thickness of approximately 6–75 µm. However, the thickness of each polymer layer depends on the viscosity of a monomeric precursor to the polymer layer and the temperature at which the monomeric precursor is applied. By using a minimal amount or thickness of polymeric material, the cost of the hydrogen diffusion barrier 2 may also be minimized.

Figure 2:
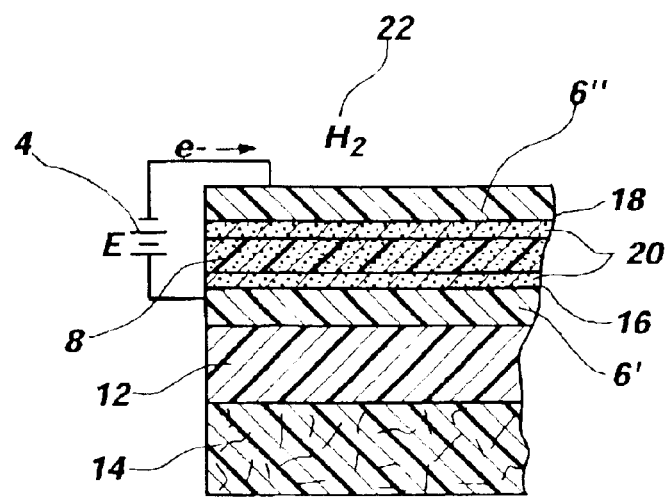
FIGS. 2 and 3 illustrate alternative embodiments of the hydrogen diffusion barrier.

The hydrogen diffusion barrier 2 may include a catalyst in the form of a catalytic metal 20 located between either or both of the electrode layers 6 and the electrolyte layer 8 as an element of the electrochemical structure for preventing the hydrogen from diffusing. For instance, a catalyst layer formed from a catalytic metal 20 may be present proximate the interface between the anode 6' and the electrolyte layer 8 and/or between the cathode 6" and the electrolyte layer 8, as shown in FIG. 2. It is currently preferred that a catalytic metal 20 be located proximate both interfaces. An electrochemical reaction may occur at each of two junctions, or phase boundaries, where hydrogen, one of the electrode layers 6, and the electrolyte layer 8 interface. The catalyst layer may be formed from a catalytic metal 20 such as a metal, metal oxide, metal alloy, or other metal compound, including mixtures of metals in groups IV-B, V-B, VI-B, VII-B, VIII, I-B, II-B, III-B, IV-A, and V-A of the Periodic Chart of the Elements. The catalytic metal 20 may include the metals, metal oxides, metal alloys, or other metal compounds of titanium, zirconium, vanadium, niobium, chromium, molybdenum, tungsten, manganese, rhenium, ruthenium, osmium, cobalt, rhodium, iridium, nickel, palladium, platinum, copper, silver, gold, zinc, cadmium, yttrium, tin, and lead. It is currently preferred that the catalytic metal 20 be nanometer-sized particles of platinum (platinum black) or ruthenium.

The catalytic metal 20 nay also be dispersed in the polymeric material of the anode layer 6' or cathode layer 6" rather than being present as an identifiable, discrete layer. The catalyst layer or dispersion of catalytic metal 20 of the hydrogen diffusion barrier 2 may be formed using known techniques of forming catalyst layers in conventional PEMs. However, the amount of catalytic metal 20 present in the hydrogen diffusion barrier 2 may be less than the amount used in the catalyst layer of a conventional PEM because the hydrogen diffusion barrier 2 is not used to generate energy. While the catalytic metal 20 is described herein as an element of the electrochemically active structure, it is also contemplated that other electrochemically active elements for catalyzing the reaction between hydrogen, protons, and electrons may be used.

While it is currently preferred that the catalytic metal 20 be present in the hydrogen diffusion barrier 2, the electrically conductive polymers used in the electrode layers 6 may also provide the necessary catalytic activity. If these polymers exhibit catalytic activity, the catalytic metal 20 may not be necessary in the hydrogen diffusion barrier 2.

The electrochemically active barrier 2 may include an energy source 4 that is operably coupled with the electrode layers 6 sandwiching the electrolyte layer 8. The energy source 4 may provide a low D.C. voltage, and very little current flow, to prevent hydrogen from diffusing out of the storage tank. The amount of energy that is necessary to prevent the diffusion of hydrogen is extremely low and, therefore, the energy source 4 may be a lithium battery, such as a conventional watch or calculator battery.

The hydrogen diffusion barrier 2 is an active barrier to hydrogen in that it uses electrochemical reactions (proximate the interfaces 16, 18 of the electrode layers 6 and the electrolyte layer 8) and the applied voltage to prevent the hydrogen from diffusing. If the applied voltage is not present to stimulate the hydrogen diffusion barrier, the hydrogen diffusion barrier 2 may be inoperative. In other words, the voltage produced by the energy source 4 may be present at all times. If, for example, the energy source 4 is not working, such as if the battery or batteries comprising the energy source 4 are depleted, hydrogen in the storage tank may diffuse through the hydrogen diffusion barrier 2 and out of the storage tank.

The hydrogen diffusion barrier 2 may be used in a conformable storage tank 10 used in a vehicle, such as an automobile, truck, or bus. The hydrogen diffusion barrier 2 prevents high-pressure hydrogen 22 (FIG. 1) from diffusing out of the conformable storage tank 10. While the embodiments described and illustrated herein show that the hydrogen diffusion barrier 2 is used in conformable storage tank 10, the hydrogen diffusion barrier 2 may also be used in any type of storage tanks used to store high-pressure hydrogen. In addition, the hydrogen diffusion barrier 2 may be used in storage tanks for storing hydrogen for applications other than as an alternative fuel for vehicles. The hydrogen diffusion barrier 2 may also be adapted to prevent compressed gases other than hydrogen from diffusing out of a storage tank. For example, the polymeric materials of the hydrogen diffusion barrier 2 may be selected to be substantially impermeable to another compressed gas but yet be able to dissociate the gas into an ionized form and transport an ionized form of that compressed gas for reformation. In addition, the catalytic metal 20 may be selected to catalyze an electrochemical reaction that uses the compressed gas or the ionized form of the compressed gas as a product or reactant.

Figure 3:
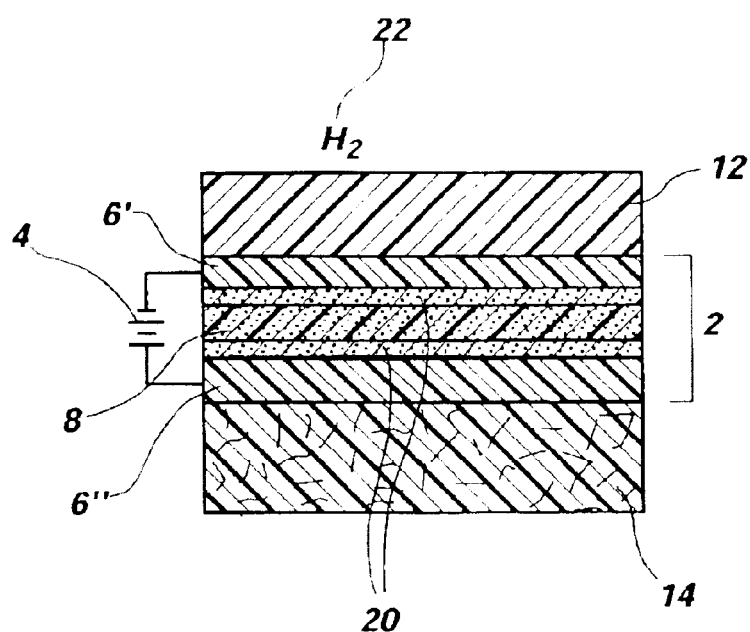

The storage tank 10 includes the polymer substrate 12, a reinforcement layer 14, and the hydrogen diffusion barrier 2. In one embodiment, the polymer substrate 12 is located between the reinforcement layer 14 and the hydrogen diffusion barrier 2, as depicted in FIG. 1. In another embodiment, the hydrogen diffusion barrier 2 is located between the polymer substrate 12 and the reinforcement layer 14, as illustrated in FIG. 3. The polymer substrate 12 may be a thermoplastic or thermosetting polymer, such as a polyamide, a polyethylene, a polypropylene, a polyurethane, and a blend or copolymer thereof. The reinforcement layer 14 may be a composite material such as a carbon, glass, graphite, aramid, or other fiber bound in a thermoplastic or thermoset epoxy resin. For instance, a two-part epoxy resin may be mixed and carbon fibers impregnated with the resin. The reinforcement layer 14 may be wound in the form of resin-coated filaments or bundles or tapes of onto the polymer substrate 12 or the hydrogen diffusion barrier 2, as known in the art. In another embodiment, the polymer substrate 12 is a cross-linked polyethylene or a nylon, such as Nylon 6, Nylon 11, Nylon 12, Nylon 66, or Nylon 610 and the reinforcement layer 14 is a graphite fiber bound in a two-part epoxy resin.

In the embodiment illustrated in FIG. 1, a first surface of the hydrogen diffusion barrier 2 may be bonded to the polymer substrate 12 by bonding one of the polymer layers to a surface of the polymer substrate 2. The first surface may be a surface of one of the electrode layers 6. A second surface of the hydrogen diffusion barrier 2 may be in contact with the hydrogen 22 stored in the storage tank 10. The second surface may be a surface of the other electrode layer 6. In the embodiment shown in FIG. 3, the polymer substrate 12 may contact the hydrogen 22 stored in the storage tank 10.

The hydrogen diffusion barrier 2 and the polymer substrate 12 may have similar modulus or stiffness values so that they do not crack when the storage tank 10 is pressurized. Rather, the hydrogen diffusion barrier 2 may pass the load or stress to the polymer substrate 12, which ultimately passes the load to the stiffer reinforcement layer 14. Since the polymer substrate 12 may be formed of plastics, such as polyethylene or nylon, which have similar modulus values to the polymeric materials used in the hydrogen diffusion barrier 2, neither the hydrogen diffusion barrier 2 nor the polymer substrate 12 will crack when the storage tank is pressurized as they will flex at substantially the same rate until supported by the stiffer reinforcement layer 14.

The three polymer layers of the hydrogen diffusion barrier 2 may be formed by techniques that produce a thin, hermetic, pin-hole free coating of the polymeric material. Each of the polymer layers may be formed individually, with a first polymer layer formed on the polymer substrate 12. The first polymer layer may be bonded to the polymer substrate and a second polymer layer formed and bonded on the underlying first polymer layer. A third polymer layer may be formed on the underlying second polymer layer and bonded thereto. The first polymer layer may be one of the electrode layers 6, the second polymer layer may be the electrolyte layer 8, and the third polymer layer may be the other electrode layer 6. Each of the polymer layers may be formed respectively in situ on the polymer substrate 12 or the underlying polymer layers by polymerizing or curing a monomeric precursor of each of the polymer layers. The polymer layers may be formed by conventional techniques including, but not limited to, dip-coating or spray-coating.

To form the first polymer layer by dip-coating, the storage tank 10 may be dipped in a solution of the monomeric precursor of the first polymer layer so that the monomeric precursor contacts the inner surface, or polymer substrate 12, of the storage tank 10. The storage tank 10 is spun so that the monomeric precursor coats the polymer substrate 12. Excess monomeric precursor is removed. The monomeric precursor coating the polymer substrate 12 is polymerized to form the first polymer layer. The monomeric precursor may be polymerized by heat, an infrared source, an ultraviolet source, or a combination thereof, to bond the first polymer layer to the polymer substrate 12, depending on the type of monomeric precursor that is used. Furthermore, an appropriate catalyst for polymerizing and thus bonding the first polymer layer to the substrate can be used, either separately, or in combination with a heat source, an infrared source, an ultraviolet source or a combination thereof. Once the first polymer layer is formed, the second and third polymer layers may be formed in substantially the same way.

If the catalytic metal 20 is present as a layer, the catalyst layer may be formed by adding a small amount of nanometer-sized particles of the catalytic metal 20 into the electrode layers 6. As previously mentioned, the amount of catalytic metal 20 present in the electrode layers 6 may be less than the amount used in a conventional PEM. The catalytic metal 20 may be mixed into the monomeric precursors of the electrode layers 6 before the electrode layers 6 are formed. Alternatively, a thin layer of the polymeric material containing the catalytic metal 20 may be applied on either side of the electrolyte layer 8. For example, the thin layer may be formed between the first polymer layer and the second polymer layer and between the second polymer layer and the third polymer layer. Since these thin layers are formed in direct contact with the electrolyte layer 8, the catalytic metal 20 may be present at the interfaces 16 and 18, where the catalytic metal 20 is most effective.

The polymer layers may also be formed by spray-coating. The first polymer layer may be formed by spraying its monomeric precursor on the polymer substrate 12. The monomeric precursor may be sprayed by inserting a nozzle in the storage tank 10, which may conventionally have a narrow opening (approximately 1–2 inches in diameter) at one end. The nozzle may be of a sufficiently small size to fit through the narrow opening. The monomeric precursor may be polymerized by heat, an infrared source, or an ultraviolet source to bond the first polymer layer to the polymer substrate 12, again depending upon the polymer density employed. The second and third polymer layers may be formed over the underlying first polymer layer in substantially the same way.

In addition to dip-coating and spray-coating, it is also contemplated that each of the polymer layers may be formed by extruding or molding each layer of the polymeric material of the combined layers into a desired shape conformable to the interior of the storage tank and pressing the polymeric material to the polymer substrate 12 using a bladder inflated within the storage tank. Extrusion and molding techniques are known in the art and, therefore, are not described in detail herein.

Figure 4A:
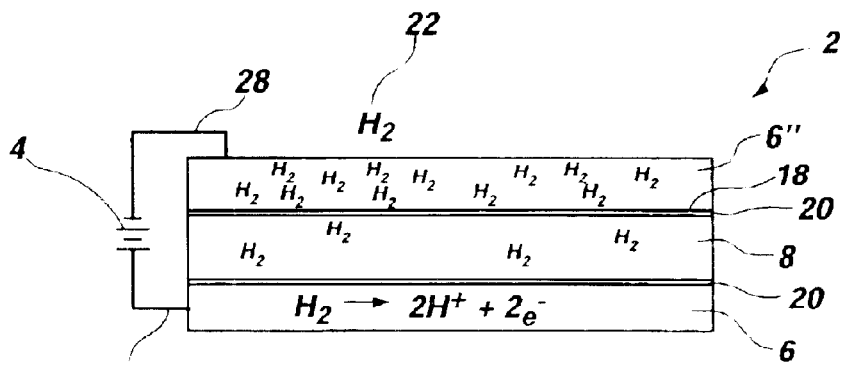
FIGS. 4A–4C illustrates the movement of hydrogen, protons, and electrons through the hydrogen diffusion barrier of the present invention.
Figure 4B:
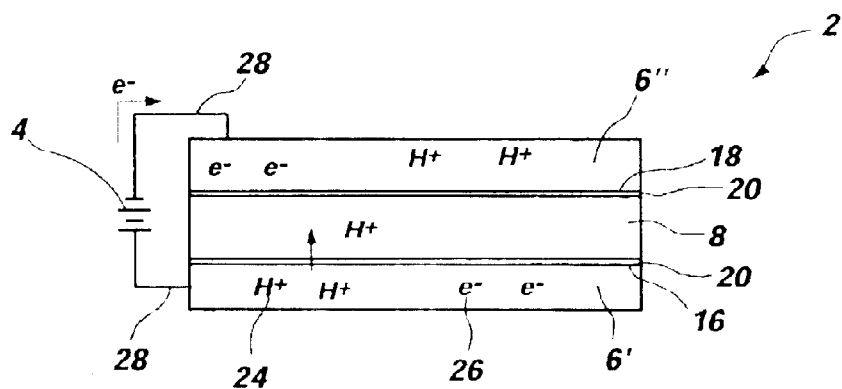
Figure 4C:
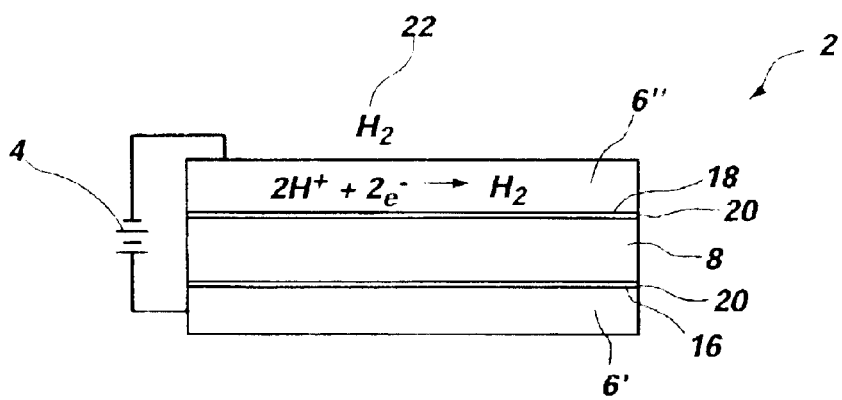

The storage tank 10 having the hydrogen diffusion barrier 2 may be pressurized with hydrogen to between approximately 5,000 and 10,000 psi. The storage tank 10 may have a burst strength of approximately 10,000 psi and a normal operating pressure of approximately 5,000–8,000 psi. When the storage tank 10 is pressurized, the hydrogen may diffuse into the cathode layer 6″ as illustrated in FIG. 4A. Upon contacting the interface 18 between the cathode layer 6″ and the electrolyte layer 8, a majority of the hydrogen 22 remains in the cathode layer 6″ because the electrolyte layer 8 is substantially impermeable to hydrogen. Since the cathode layer 6″ is porous, the hydrogen 22 may also diffuse out of the cathode layer 6″ and back into the storage tank 10. However, a very small portion of the hydrogen 22 may pass into the electrolyte layer 8 and diffuse through the electrolyte layer 8 to reach the anode layer 6′. The hydrogen 22 may be converted (disassociated) into protons 24 and electrons 26 proximate interface 16 by the catalytic metal 20 in the reaction $H_2 \rightarrow 2H^+ + 2e^-$. The electrons 26 are conducted through an electrically conductive material of conductive traces 28 through an external circuit of the energy source 4 to the cathode layer 6″, while the protons 24 are transported back through the proton-permeable electrolyte layer 8 to the cathode layer 6″, as shown in FIG. 4B. The hydrogen permeability and proton conductivity of the electrolyte layer 8 may be related such that one-half of the proton flux through the electrolyte layer 8 is approximately equal to the hydrogen flux across the electrolyte layer 8, thereby providing a net zero flux of hydrogen and protons across the electrolyte layer 8. The energy source 4 produces a voltage sufficient to transport the electrons 26 to the cathode layer 6″. The protons 24 and transported electrons 26 react proximate the interface 18 in the reaction $2H^+ + 2e^- \rightarrow H_2$ to form hydrogen 22, such reaction being facilitated by the presence of catalytic metal 20 proximate interface 18, the hydrogen then diffusing back into the storage tank 10, as shown in FIG. 4C.

Since only a small portion of the hydrogen 22 passes through the electrolyte layer 8, a partial pressure of hydrogen at the interface 16 of the anode layer 6′ and the electrolyte layer 8, referred to herein as $PH_2''$, may be low. $PH_2''$ may be between approximately $1 \times 10^{-10}$ and $1 \times 10^{-2}$ atmospheres ("atm"). Since only a low partial pressure of hydrogen is present at interface 16, the voltage necessary to transport the protons 24 and electrons 26 to the cathode layer 6″ may be quite low. The required applied voltage may be derived from the Nernst equation:

$$E = \Delta G/nF = RT/nF \times ln(PH_2'/PH_2'')$$

where E is the applied voltage, $\Delta G$ is the free energy of the reaction, n is the number of electrons involved in the reaction, F is Faraday's constant (96,520 C/mole), R is the universal gas constant (8.314 J/g mole K), T is temperature, and $PH_2'$ is the partial pressure of hydrogen in the storage tank.

Thus, the energy required to transport the electrons 26 to the cathode layer 6″ may be calculated using the Nernst equation. For sake of example only, the following assumptions may be made: the reaction may be run at 300K, the hydrogen in the storage tank ($PH_2'$) may be pressurized to 200 atm (2939.4 psi), and the desired partial pressure of hydrogen ($PH_2''$) at the interface 16 may be $1 \times 10^{-10}$ atm. For the electrochemical reaction converting hydrogen to protons and electrons, the number of electrons involved in the reaction, or n, is 2. Using these assumptions, the applied energy is 0.366 volts, which is less than the voltage which, may be derived from a conventional lithium watch or calculator battery.

The present invention encompasses a hydrogen diffusion barrier that prevents hydrogen from diffusing out of a storage tank, and a storage tank incorporating the hydrogen diffusion barrier. The hydrogen diffusion barrier includes three polymer layers and an energy source and uses an electrochemically active structure to prevent the hydrogen from diffusing. A method of preventing hydrogen from diffusing out of the storage tank is also encompassed by the present invention, as is a method of fabricating the storage tank.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electrochemically active hydrogen diffusion barrier, comprising:
    an anode layer and a cathode layer, each of the anode layer and the cathode layer comprising a polymer material that is permeable to hydrogen;
    an electrolyte layer disposed between the anode layer and the cathode layer, the electrolyte layer comprising a polymer material that is conductive to protons and substantially impermeable to hydrogen;
    a voltage source operably coupled to the anode layer and the cathode layer; and
    a catalytic material proximate an interface between at least one of the anode layer and the electrolyte layer and the cathode layer and the electrolyte layer.

2. The electrochemically active hydrogen diffusion barrier of claim 1, wherein the catalytic material comprises a catalytic metal proximate the interface of the electrolyte layer and the anode layer.

3. The electrochemically active hydrogen diffusion barrier of claim 1, wherein the catalytic material is selected from the group consisting of platinum, ruthenium, tungsten, molybdenum, and tin.

4. The electrochemically active hydrogen diffusion barrier of claim 1, wherein the catalytic material proximate the interface of the electrolyte layer and the anode layer is active to produce protons and electrons from hydrogen.

5. The electrochemically active hydrogen diffusion barrier of claim 1, wherein the voltage source operably coupled to the anode layer and to the cathode layer comprises an electron transport path for produced electrons.

6. The electrochemically active hydrogen diffusion barrier of claim 1, wherein the catalytic material comprises a catalytic metal proximate the interface of the electrolyte layer and the cathode layer.

7. The electrochemically active hydrogen diffusion barrier of claim 1, wherein the catalytic material proximate the interface of the electrolyte layer and the cathode layer is active to produce hydrogen from protons and electrons.

8. The electrochemically active hydrogen diffusion barrier of claim 1, wherein the polymer material of the anode layer and of the cathode layer is a dense polymer or a porous polymer.

9. The electrochemically active hydrogen diffusion barrier of claim 1, wherein the polymer material of the electrolyte layer comprises a dense, proton-conducting electrolyte.

10. The electrochemically active hydrogen diffusion barrier of claim 1, wherein the polymer material of the electrolyte layer comprises a dry electrolyte material.

11. The electrochemically active hydrogen diffusion barrier of claim 1, wherein the polymer material of the electrolyte layer is selected from the group consisting of polybenzimidazole, a microporous polymer matrix filled with an inorganic proton conductor, a perfluorinated sulfonic acid derivative, a polytetrafluoroethylene, a tetrafluoroethylene/(perfluoroalkyl) vinyl ether copolymer, a tetrafluoroethylene/hexafluoropropylene copolymer, a poly(trifluorostyrene) copolymer, a sulfonated poly(aryl ether ketone), a sulfonated polyaromatic based system, and a sulfonated poly(2,6-dimethyl-1,4-phenylene oxide).

12. The electrochemically active hydrogen diffusion barrier of claim 1, wherein the catalytic material comprises a catalytic metal proximate the respective interfaces between the anode layer and the electrolyte layer and between the cathode layer and the electrolyte layer.

13. The electrochemically active hydrogen diffusion barrier of claim 12, wherein the catalytic material proximate the interface of the electrolyte layer and the anode layer is active to produce protons and electrons from hydrogen.

14. The electrochemically active hydrogen diffusion barrier of claim 1, wherein the polymer material of the anode layer comprises polyaniline, polypyrrole, mixtures of polyaniline and polypyrrole, or poly(3,4-ethylenedioxythiophene) polystyrenesulfonate.

15. The electrochemically active hydrogen diffusion barrier of claim 1, wherein the polymer material of the cathode layer comprises polyaniline, polypyrrole, mixtures of polyaniline and polypyrrole, or poly(3,4-ethylenedioxythiophene) polystyrenesulfonate.

16. The electrochemically active hydrogen diffusion barrier of claim 1, wherein the voltage source comprises a lithium battery.

17. The electrochemically active hydrogen diffusion barrier of claim 1, wherein each of the anode layer, the cathode layer, and the electrolyte layer is a hermetic coating of the polymer material.

18. An electrochemically active hydrogen diffusion barrier, comprising:

an anode layer and a cathode layer, each layer comprising a polymer material that is permeable to hydrogen;

an electrolyte layer disposed between the anode layer and the cathode layer, the electrolyte layer comprising a polymer material that is conductive to protons and substantially impermeable to hydrogen;

a voltage source operably coupled to the anode layer and the cathode layer, wherein the voltage source provides energy to transport electrons to the cathode layer; and a catalytic material proximate an interface between at least one of the anode layer and the electrolyte layer and the cathode layer, and the electrolyte layer.

* * * * *